Patented Dec. 26, 1944

2,366,129

UNITED STATES PATENT OFFICE 2,366,129

WATER-SOLUBLE RESINOUS PRODUCTS AND PROCESS OF MAKING

John B. Rust, Verona, N. J., assignor to Montclair Research Corporation, a corporation of New Jersey No Drawing. Application August 4, 1942,
Serial No. 453,553

11 Claims. (Cl. 260—70)

The present invention relates to water-soluble resinous products and the process of making same. It is an object of this invention to produce water-soluble resinous materials having varying degrees of hygroscopicity and which may be employed as oil-proof coatings and cements, agricultural sprays, water paints, cosmetic preparations, paper and textile sizings, adhesives, leather and rubber coatings and the like. Furthermore, the products of the present invention in some cases may be used as flame retarders. It is a further object of this invention to provide resinous materials which are either permanently water-soluble or, if desired, may be cured on the application of heat to insoluble infusible masses.

In the process of the present invention an amino compound is heated with a polyfunctional inorganic acid such as boric, o-phosphoric, pyrophosphoric acids and the like to first produce polyamino borates, phosphates, etc., which are dehydrated on further heating to yield resinous bodies readily soluble in water and which may be used as indicated above. Furthermore, the polyamine borates, phosphates, etc., or their dehydration products may be heated with nitrogenous material such as urea or the urea derivatives. Thus, a resinous material is formed by heating tetraethylene pentamine borate with dicyanodiamide to 210° C. The resin so obtained is infusible but may be dissolved in water. The water solutions of these urea-, or urea derivative-fusion products may be further reacted, if desired, with an aldehyde such as formaldehyde to yield materials which can be rendered insoluble on dehydration and further application of heat.

In the present invention as the amino compound I prefer to employ amines of the general type represented by $NH_2(CH_2CH_2NH)_nH$ (where $n$ is an integer less than 6) such as ethylenediamine, diethylenetriamine, triethylene tetramine, tetraethylenepentamine and the like, or amino compounds such as diethanol amine, trishydroxymethylaminomethane, 2-amino-2-methyl-1,3-propanediol and the like. As the inorganic acid component I prefer to employ boric acid, pyroboric acid, boric anhydride, or ortho-, meta-, pyro- and hypophosphoric or phosphorus acids.

If it is desired to form the nitrogenous derivatives of the polyamino-inorganic products of the present invention, I may employ urea, guanidine, dicyandiamide, biguanide, guanyl urea and the like.

The following examples are given to illustrate the products of the present invention and the process whereby they are obtained. All proportions are in parts by weight.

*Example 1.*—20 parts of tetraethylenepentamine were mixed with 20 parts of boric acid and heated slowly to 180° C. A clear melt was first obtained which gradually increased in viscosity as water was eliminated. After heating for about 30 minutes at 180° C. the melt was poured and a pale yellow, hard, brittle, water-soluble resin was secured when cooled.

*Example 2.*—18.9 parts of tetraethylenepentamine were mixed with 19 parts of 85% o-phosphoric acid. A solid tetraethylenepentammonium phosphate was obtained with evolution of heat. The material was heated up to 190°–200° C. for about 30 minutes. Water was eliminated and the melt increased in viscosity. On cooling a hard, brittle, pale yellow water-soluble resin was secured.

*Example 3.*—17.2 parts of tetraethylenepentamine, 10.3 parts of boric acid and 42 parts of dicyandiamide were heated together with stirring to 170° C. An exothermic reaction occurred raising the temperature to 220° C. The resinous melt increased in viscosity rapidly, finally hardening and swelling to a vesiculated mass. When cool the mass was broken up. It was a white non-hygroscopic powder, soluble in water.

30 parts of the above resinous material were dissolved in 32 parts of water and 38 parts of 37½% aqueous formaldehyde solution. The solution was boiled under a reflux condenser for 30 minutes. When cool the solution was pale yellow and viscous. The solution on drying in films and heating to 100°–150° C. yielded water-insoluble coatings. The solution was very stable at ordinary temperatures and could be used as an adhesive, textile size and the like.

*Example 4.*—15 parts of tetraethylenepentamine and 15 parts of pyrophosphoric acid were heated together to 180° C. for 20 minutes with the elimination of water. On cooling a hard, brittle, pale yellow water-soluble resin was secured.

*Example 5.*—14.6 parts of triethylene tetramine, 6.2 parts of boric acid and 18 parts of urea were heated to 180° C. until the foaming and elimination of ammonia had ceased. During this time the resinous melt increased greatly in viscosity. A hard, brittle, pale colored water-soluble resin was secured.

The resin as described above was dissolved in 40 parts of water and 30 parts of 37½ aqueous formaldehyde solution. The solution was refluxed at boiling for 30 minutes. When cool the solution had a light viscosity and was very stable. On pouring onto a plate and heating, the solution dried and cured to a water-insoluble film.

*Example 6.*—11 parts of triethylene tetramine, 11 parts of o-phosphoric acid and 21 parts of dicyandiamide were heated up to 220° C. During heating the melt increased rapidly in viscosity and finally swelled to a hard, vesiculated mass. This was broken up on cooling to give a white, water-soluble powder. A water solution gave a non-tacky film on drying.

To 15 parts of the above phosphorylated resin, 20 parts of 37½% aqueous formaldehyde solution and 65 parts of water were added. The solution was heated under a reflux condenser at boiling for about 30 minutes. A pale yellow non-viscous solution resulted, which could be cured to water-insoluble films.

*Example 7.*—12.1 parts of trishydroxymethyl aminomethane and 6.2 parts of boric acid were mixed and heated. The temperature was taken slowly up to 210° C. when a melt was formed. Heating was continued until foaming stopped. There was obtained a pale yellow, very high melting, non-hygroscopic resin which was water-soluble. A solution of this resin dried to clear, white, non-tacky film.

The resin was useful as textile size, adhesive, water paint and the like.

*Example 8.*—21 parts of 2-amino-2-methyl-1,3-propanediol and 12.4 parts of boric acid were mixed and heated. The melt rapidly became viscous and foamed considerably. The temperature was raised to 215° C. slowly and heating continued until foaming had ceased or for about 20 minutes. A pale, clear, hard, rather high melting resin was obtained which was readily soluble in water. The water solution of the resin dried to a hard film.

I claim:

1. Process of making water-soluble resin comprising reacting by heating together at 180° C.–220° C.: an amine of formula $NH_2(CH_2CH_2NH)_nH$ where $n$ is an integer less than 6, a polyfunctional inorganic acid selected from the group consisting of boric and phosphoric acids, and a nitrogenous compound selected from the group consisting of urea, guanidine, dicyandiamide, biguanide and guanylurea; dissolving said reaction product in water and heating with formaldehyde to secure a water-soluble reaction product which may be cured by application of heat.

2. Process of making water-soluble resin comprising heating tetraethylenepentamine with boric acid at 180°–220° C. with the elimination of water until a fusible resin is secured.

3. Process of making water-soluble resin comprising heating tetraethylene pentamine, boric acid and dicyandiamide to 220° C., dissolving said reaction product in water and heating with formaldehyde to secure a water-soluble reaction product which may be cured on application of heat.

4. Process of making water-soluble resin comprising heating triethylene tetramine, boric acid, and urea to 220° C., dissolving said reaction product in water, heating with formaldehyde to obtain a water-soluble reaction product which may be cured to a water-insoluble form by application of heat.

5. Process of making water-soluble resin comprising heating tetraethylenepentamine with phosphoric acid at 180°–220° C. with the elimination of water until a fusible resin is secured.

6. Process of making water-soluble resin comprising heating tetraethylenepentamine, phosphoric acid and dicyandiamide to 220° C., dissolving said reaction product in water and heating with formaldehyde to secure a water-soluble reaction product which may be cured on application of heat.

7. Water-soluble resin comprising the reaction product of formaldehyde upon the product obtained by reacting: an amine of formula $$NH_2(CH_2CH_2NH)_nH$$

where $n$ is an integer less than 6, a polyfunctional inorganic acid selected from the group consisting of boric and phosphoric acids, and a nitrogenous compound selected from the group consisting of urea, guanidine, dicyandiamide, biguanide and guanylurea; the product with which formaldehyde is reacted being formed at 180°–220° C. and with the elimination of water.

8. Water-soluble resin comprising the reaction product of tetraethylenepentamine and boric acid formed at 180°–220° C. with the elimination of water.

9. Water-soluble resin comprising the reaction product of tetraethylenepentamine and phosphoric acid formed at 180°–220° C. with the elimination of water.

10. Water-soluble resin comprising the reaction product of formaldehyde upon the product obtained by reacting: tetraethylenepentamine, boric acid and dicyandiamide, the latter product being formed at 180°–220° C. and with elimination of water.

11. Water-soluble resin comprising the reaction product of formaldehyde upon the product obtained by reacting: tetraethylenepentamine, phosphoric acid and dicyandiamide, the latter product being formed at 180°–220° C. and with elimination of water.

JOHN B. RUST.